Nov. 26, 1957 G. R. THOMAS 2,814,525
FLEXIBLE SEALING STRIP FOR WINDOWS
Filed July 31, 1953 2 Sheets-Sheet 1
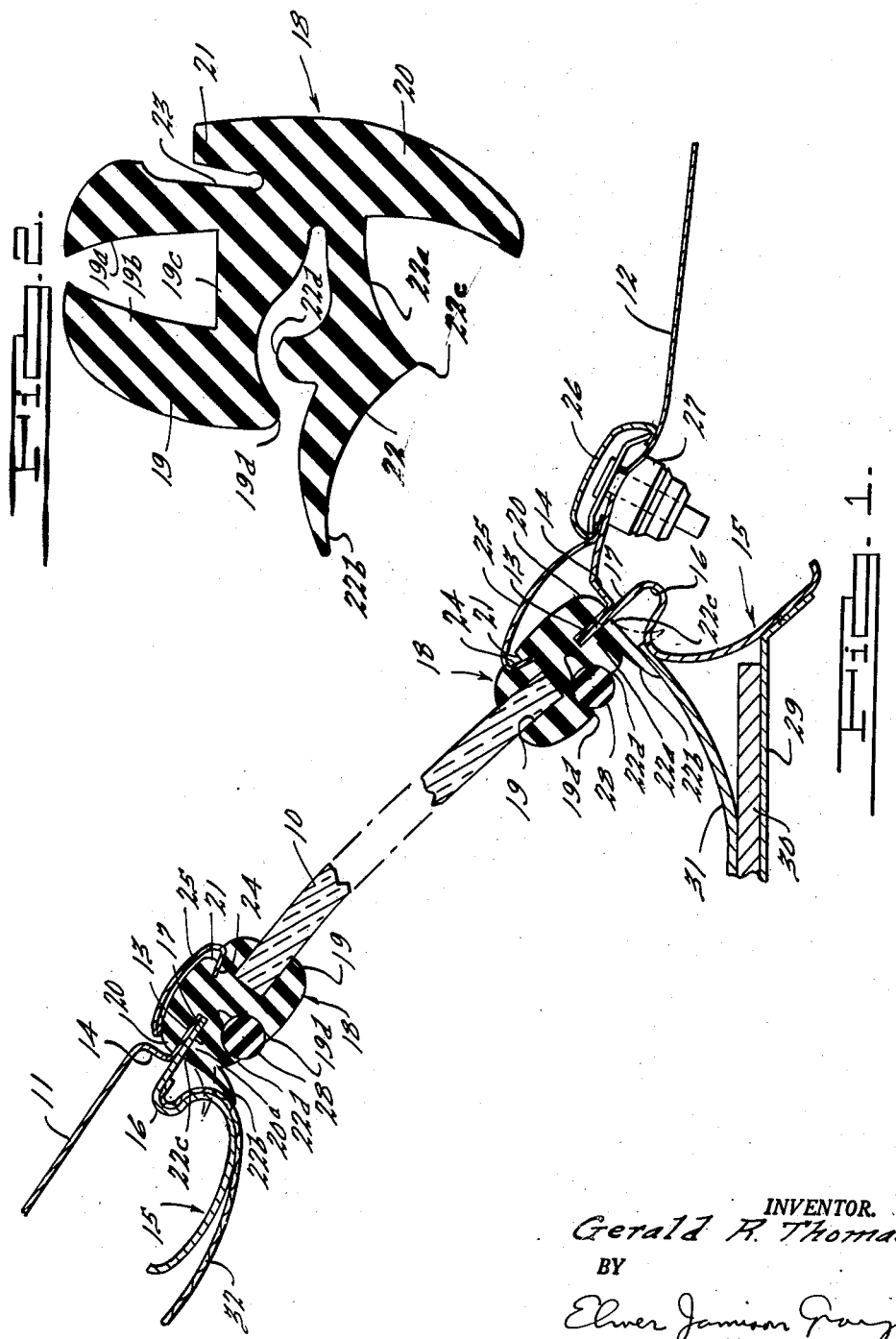
INVENTOR.
Gerald R. Thomas.
BY
Elmer Jamison Gray
ATTORNEY Nov. 26, 1957 G. R. THOMAS 2,814,525
FLEXIBLE SEALING STRIP FOR WINDOWS
Filed July 31, 1953 2 Sheets-Sheet 2

INVENTOR.
Gerald R. Thomas.
BY
Elmer Jamison Gray
ATTORNEY.

United States Patent Office 2,814,525
Patented Nov. 26, 1957

2,814,525

FLEXIBLE SEALING STRIP FOR WINDOWS

Gerald R. Thomas, Detroit, Mich., assignor, by mesne assignments, to Chrysler Corporation, a corporation of Delaware Application July 31, 1953, Serial No. 371,490

2 Claims. (Cl. 296—93)

This invention relates generally to improvements in a vehicle body construction and to a weather sealing strip for securing adjacent edges of panels together, as for example for securing a fixed vehicle window panel in position with respect to the edge of a vehicle body panel or window frame flange.

An object of the present invention is to provide improved means for mounting a fixed window panel within the window opening of a vehicle body including a flexible sealing strip engageable with the edge of the window panel and a fixed flange defining the adjacent edge of the window opening, the sealing strip having an inwardly directed lip or trim flange adjacent the fixed flange adapted to overlap and conceal the adjacent edge of the vehicle interior trim structure, thereby to achieve a neat and attractive appearance.

Another object is to provide an improved window frame and sealing strip combination wherein the frame is provided with an interior groove confronting the adjacent edge of the window panel. The edge of an interior lining for the vehicle body, such as the headlining, is secured within the groove which is overlapped and concealed by the inwardly directed lip or trim flange of the sealing strip. By virtue of such a structure assembly of the headlining or other vehicle trim lining within the body is facilitated. The edges of the lining are drawn tightly around the adjacent edge of the groove and cemented to the adjacent inner sidewall thereof. The lining is thus maintained taut and excess folds or material thereof at its edges are concealed within the groove, whereby the problem of properly aligning the edges of the lining within the body during assembly is appreciably simplified. In addition the edges of the lining cemented within the groove extend angularly to the plane of the taut lining inwardly of the groove, affording increased resistance to being pulled loose by tension in the lining.

Another object is to provide a structure of the foregoing character which facilitates the assembly of a fixed window panel in position, such as an automobile windshield or rear window panel. The window frame is provided with an edge portion or fixed flange defining the window opening and directed toward the adjacent edge of the window panel. The resilient sealing strip comprises a channel portion adapted to receive the edge of the window panel snugly therein and also comprises an outer flange arranged to engage the outer surface of the fixed edge portion of the window frame when the strip and window panel are assembled within the window opening. Also comprising a portion of the sealing strip is a deformable flap having an outer portion projecting inwardly from the outer flange and having an inner portion terminating inwardly in said lip or trim flange.

The edge of the window panel can thus be secured within the channel portion of the sealing strip and thereafter assembled within the widow opening from the exterior of the vehicle body, with the outer flange of the sealing strip snugly abutting the outer surface of the frame's fixed edge portion and with the deformable flap projecting inwardly between said edge portion and the channel portion of the sealing strip. Thereafter a filler or spreader strip is forced between the channel portion and flap to swing the latter away from the former to a deformed or locking position whereat the outer portion of the flap snugly engages the inner surface of said edge portion and the inner lip portion of the flap projects angularly inward with respect to said edge portion so as to overlap the adjacent interior trim structure of the vehicle as aforesaid.

Other objects of this invention will appear in the following description and appended claims, reference being had to the accompanying drawings forming a part of this specification wherein like reference characters designate corresponding parts of the several views.

Details of a vehicle construction embodying the present invention are illustrated by way of example in the following drawings wherein:

Fig. 1 is a fragmentary vertical longitudinal section through the rear window structure.

Fig. 2 is an enlarged transverse section showing the sealing strip in the non-deformed condition prior to assembly with the window panel.

Figure 3:
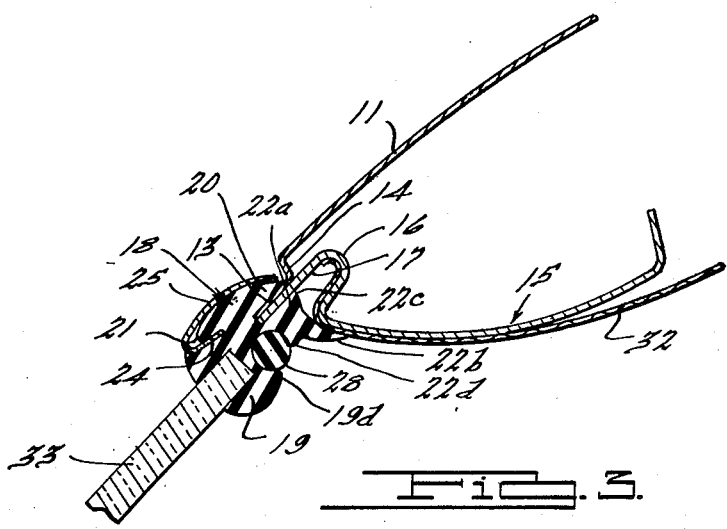
Fig. 3 is a fragmentary vertical longitudinal section through the upper portion of the windshield structure.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a transparent rear window panel 10 is shown mounted within the rear window opening of an automobile body, Fig. 1. The latter comprises an outer panel structure, including a roof panel 11 and rear deck panel 12, which terminates in a rigid edge flange 13 offset inwardly of the outer panel structure by a connecting flange 14 approximately perpendicular to the flange 13. The latter extends around the periphery of the window panel 10 and is directed toward the same substantially in parallelism with the adjacent outer surface thereof.

Also extending around the window opening inward of the flange 13 is a window frame panel or structure 15 having a groove 16 therein opening toward the adjacent edge of panel 10. The outer sidewall 17 of the groove 16 comprises a reinforcing flange coterminous with the flange 13 along an edge defining the window opening, the portions 13 and 17 being parallel and welded together to provide a rigid edge portion of the vehicle body panel structure spaced from the adjacent marginal edge of the panel 10 and cooperable with an elastic sealing strip 18 to secure the panel 10 positively in position.

The strip 18 extends around the window panel 10 and comprises in the present instance a deformable body of rubber or rubber-like material of uniform cross section throughout its length having a channel portion 19, an outer flange 20, a retainer 21, and a deformable swinging flange or flap 22, Fig. 2. The channel portion 19 comprises converging outer and inner channel sides 19a and 19b adapted to receive and snugly confine the adjacent edge of the panel 10 therebetween and also comprises a channel base 19c which extends generally perpendicularly to the plane of the panel 10 when assembled therewith. The outer flange 20 in the assembled position projects generally oppositely from the outer sidewall 19a almost to the connecting flange 14 and snugly engages the outer surface of the edge portion 13, 17.

The retainer 21 projects oppositely from the flange 20 and is spaced from the outer sidewall 19a by a recess 23 having a channel portion opening in the same direction as the channel portion 19 and adapted to receive therein the inbent flange 24 of a garnish molding 25, Fig. 1, which extends along the exterior of the strip 18 and partially conceals the same. Below the rear window, the lower edge of the molding 25 meets the panel 12 and is concealed by a transverse trim molding 26 secured to panel 12 by fasteners 27. During assembly, the flange 24 is first inserted into the channel of the recess 23. Thereafter the edges of the panel 10 are inserted into the channel portion 19 so as to spread the converging sidewalls 19a and 19b and collapse the channel portion of the recess 23, thereby to confine the flange 24 securely within the recess 23.

The flap 22 when not under tension projects at a non-deformed position, Fig. 2, generally perpendicularly inward from the flange 20 adjacent the channel base 19c and is spaced from the latter so as to swing therefrom to a deformed position, Fig. 1. An outer panel engaging portion 22a of the flap 22 connected with the flange 20 enlarges inwardly to a thickened intermediate portion from which the flap 22 tapers inwardly to comprise an inner trim or lip portion 22b. The surface of the outer portion 22a remote from the channel portion 19 is concave and meets the inner surface of the flange 20 generally at right angles thereto when the flap is at the non-deformed position, curving away from the channel portion to an edge 22c of said intermediate thickened portion. The contiguous surface of the inner portion 22b is also concave and meets the concave surface of the outer portion 22a generally perpendicularly thereto at the edge 22c, then curves inwardly and away from the channel portion 19 to a thin inner lip or edge of the flap 22 located at the non-deformed position in a plane extending longitudinally of the strip 18 and passing through the juncture of the outer portion 22a with the flange 20 generally perpendicularly to the latter.

By virtue of the construction described thus far, the rear window panel 10 is readily assembled from the rear exterior of the vehicle body. The strip 18, with the assembled molding 25, is first assembled around the panel 10 with the edges of the latter within the channel portion 19. The panel 10 is then moved into position from the rear of the window opening until the flange 20 firmly engages the outer surface of the edge portion 13, 17. In this regard, the juxtaposed edges of the latter and panel 10 are spaced sufficiently to permit insertion of the flap 22 readily inwardly through the window opening adjacent the edge portion 13, 17. The flap will swing toward the channel portion 19 as the edge 22c passes the edge portion 13, 17 and will thereafter substantially resume its non-deformed position, extending inwardly normally to the planes of the panel 10 and edge portion 13, 17 when the latter is engaged by the flange 20.

The panel 10 is finally locked in the assembled position by a flexible filler or spreader strip 28 of circular section adapted to extend longitudinally of the strip 18 and to be forced between the channel portion 19 and flap 22 by means of a suitable tool. The strip 28 is preferably of harder material than the strip 18 and is thus adapted to force the channel portion 19 snugly against the panel 10 and to swing the flap 22 away from the channel portion 19 to the deformed position, Fig. 1. At the deformed position the outer portion 22a of the flap snugly engages the inner surface of the edge portion 13, 17, cooperating with the flange 20 to comprise a channel having the edge portion 13, 17 firmly gripped therein. By reason of the perpendicularity of the concave surfaces of the outer and inner portions 22a and 22b at the edge 22c, the inner portion 22b at the deformed position projects inwardly from the edge 22c substantially normally to the edge portion 13, 17 and across the mouth of the groove 16, concealing the latter as described below.

In order to lock the filler or spreader strip 28 between the flap 22 and channel portion 19, the surface of the base portion 19c confronting the flap 22 is concave at the region of the latter's thickened portion at the non-deformed position and terminates inwardly at a locking bead or rib 19d which projects toward the flap 22. Likewise the thickened portion of the flap 22 includes a locking bead or rib 22d which projects at the non-deformed position into the confronting concavity of the channel portion 19. In the assembled position, the strip 28 is engaged inwardly by the beads 19d and 22d and is thus positively interlocked with the strip 18.

Below the rear window panel 10 is a horizontal package tray comprising a panel 29 which extends rearwardly from the rear seat of the vehicle to the frame member 15 and is welded thereto at a location below the groove 16. An insulating pad 30 is supported on the panel 29 and a fiber board interior trim structure or panel 31 overlying the pad 30 terminates rearwardly in an upwardly curved edge supported on the forward upper edge of the groove 16 and underlying the inward extension of the lip or inner trim portion 22b of the finally deformed strip 18, Fig. 1. As indicated by the dotted structure in Fig. 1 showing the position which the lip 22b would assume were it not supported by the panel 31, the lip 22b exerts a downward pressure on the panel 31.

Above and along portions of the sides of the rear window 10, the vehicle interior trim comprises the headlining 32 which extends tautly around the inner edge of the groove 16 between the latter and the lip 22b and is cemented within the groove 16 to the inner sidewall thereof. Any excess edge material of the headlining 32 is conveniently contained within the groove 16 and concealed by the lip 22b. During assembly of the headlining, the flexible lip 22b is temporarily sprung away from the groove 16 until the headlining is cemented in position, whereupon the lip 22b is released and permitted to spring back to its final assembled position, concealing the groove 16 and engaging the headlining 32 under tension as indicated by the aforesaid dotted structure in Fig. 1 showing the position which the lip 22b would assume were it not supported by the headlining 32.

Figure 4:
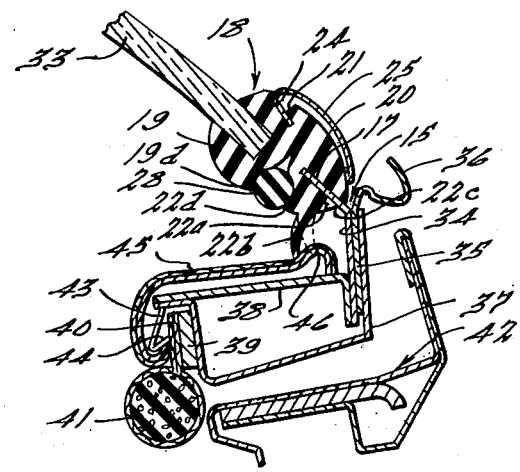
Fig. 4 is a fragmentary horizontal section through the right front pillar adjacent the windshield structure.

Referring to Figs. 3 and 4, the strips 18 and 28 are shown assembled with a transparent windshield panel 33 having its edges confined within the channel portion 19. In this instance, the vehicle structure adjacent the upper edge of the windshield 33, including the roof panel 11, connecting flange 14, and frame structure 15, is substantially identical part for part with the corresponding structure adjacent the upper edge of the rear panel 10. The flange 17 of the frame structure 15 extends around the windshield opening to comprise a rigid edge portion directed toward the adjacent edges of the windshield 33 in parallelism with the plane thereof.

Along the sides of the windshield 33, the frame 15 comprises a flange 34 adjacent and inward of the rearwardly extending flange 35 of a drip molding 36, the flange 34 projecting rearwardly from the flange 17 and the flanges 34 and 35 being welded together and to the outer side of a forwardly opening channel 37 of the front body pillar. The latter in the present instance comprises a welded structure of box section completed by an L-shaped reinforcement 38 having a rearwardly directed outer leg welded to the inside of the flange 34. The inner side of the pillar is rabbeted to receive a mounting strip 39 and the fabric attachment tabs 40 of an interior windlace 41 which closes the crack between the pillar and front door 42 when the latter is closed. The tabs 40 extend forwardly from the windlace 41 and are suitably secured to the strip 39 which in turn is secured to the channel 37.

Extending along the front pillar and secured within the inner rabbeted portion thereof is a molding 43 having a rear flange 44 directed outwardly and forwardly toward the inner surface of the tabs 40 and terminating thereagainst to provide a rearwardly opening notch. Concealing the forward and inner portions of the front pillar is a fabric covered trim structure or panel 45 having a rear edge engaged within the notch formed by the flange 44. The panel 45 extends from its rear edge around the molding 43 and partially around the reinforcement 38, terminating in a forwardly projecting bead or rib 46 adjacent the edge portion 17 and laterally of the lip 22b at the finally assembled position, Fig. 4. The lip 22b which would otherwise assume the dotted position shown in Fig. 4 is held inward under tension by the bead 46.

Assembly of the windshield 33 from the front exterior of the vehicle body is accomplished substantially in the manner of assembly of the panel 10 from the rear. The strip 18 with the assembled molding 25 is first placed around the windshield 33 with the edge thereof confined within the channel portion 19. Thereafter the windshield 33 is moved rearwardly into position within its opening until the outer flange 20 snugly engages the inner surface of the edge flange or portion 17, with the flap 22 projecting inward of said edge portion. The filler strip 28 is then inserted as before, binding the edges of the windshield 33 within the channel portion 19 and forcing the flap 22 to the deformed position whereat the lip 22b overlaps and presses toward the inner edge of the groove 16, Fig. 3, and also presses toward the inner edge of the bead 46, Fig. 4.

I claim:

1. In a vehicle body having a window frame structure defining a window opening, a window panel in said opening, said frame structure having an edge flange spaced from and directed toward an adjacent edge of said panel and also having a groove therein inwardly of said edge flange, a resilient sealing strip having a channel portion confining said edge of the panel snugly therein, said strip having an outer flange snugly engaging the outer surface of said edge flange, said strip also having a deformed flap projecting inwardly from said outer flange between said channel portion and said edge flange, a filler strip inserted between said channel portion and flap for holding said flap in a deformed position, the outer portion of said flap in said deformed position snugly engaging the inner surface of said edge flange, an interior lining for said body having an edge extending into said groove and being secured to the interior surface thereof, the inner portion of said flap in said deformed position extending inward from said edge flange and overlapping said groove to conceal the same.

2. In a vehicle body having a window frame structure defining a window opening, a window panel in said opening, said frame structure having an edge flange spaced from and directed toward an adjacent edge of said panel and also having a groove therein inwardly of said edge flange, a resilient sealing strip having a channel portion confining said edge of the panel snugly therein, said strip having an outer flange snugly engaging the outer surface of said edge flange, said strip also having a deformed flap projecting inwardly from said outer flange between said channel portion and said edge flange, a filler strip inserted between said channel portion and flap for holding said flap in a deformed position, the outer portion of said flap in the deformed position snugly engaging the inner surface of said edge flange, an interior lining for said body having an edge extending into said groove, said groove spacing said edge flange from an interior shoulder of said frame and opening in the direction generally parallel to the plane of said headliner at a location adjacent to and spaced from said frame, and said edge of the headliner extending from said plane around said shoulder in a reverse loop and being secured to the interior surface of said groove, the inner portion of said flap in said deformed position extending inward from said edge flange and overlapping said groove to conceal the same.

References Cited in the file of this patent

UNITED STATES PATENTS

| | | |
|---|---|---|
| 2,369,579 | Kobligk | Feb. 13, 1945 |
| 2,497,276 | Scott et al. | Feb. 14, 1950 |
| 2,547,799 | Wernig | Apr. 3, 1951 |
| 2,612,972 | Heimgartner | Oct. 7, 1952 |
| 2,647,289 | Harbert | Aug. 4, 1953 |
| 2,763,345 | Clingman et al. | Sept. 18, 1956 |

FOREIGN PATENTS

| | | |
|---|---|---|
| 630,827 | Great Britain | Oct. 21, 1949 |
| 639,629 | Great Britain | July 5, 1950 |